I. ANDREWS

April 25, 1933. ANTIRATTLE DEVICE Re. 18,800

Original Filed Nov. 3, 1930

Inventor
Isaac Andrews

By C. A. Snow & Co.
Attorneys.

Reissued Apr. 25, 1933 Re. 18,800

UNITED STATES PATENT OFFICE

ISAAC ANDREWS, OF SPARTANBURG, SOUTH CAROLINA

ANTIRATTLE DEVICE

Original No. 1,813,132, dated July 7, 1931, Serial No. 493,130, filed November 3, 1930. Application for reissue filed October 31, 1932. Serial No. 640,573.

This invention relates to an anti-rattling device designed for use in connection with motor vehicle doors.

The primary object of the invention is to provide a device of this character which will act to restrict movement of the door with respect to the body of the car, to prevent rattling of the door, as the vehicle passes over irregularities in a road surface.

An important object of the invention is to provide means for insuring a close fit between the door and its jamb, means being provided for guiding the door to its proper closed position.

Another important object of the invention is to provide means for cushioning the movements of the door with respect to the door jamb, thereby reducing noise to the minimum.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
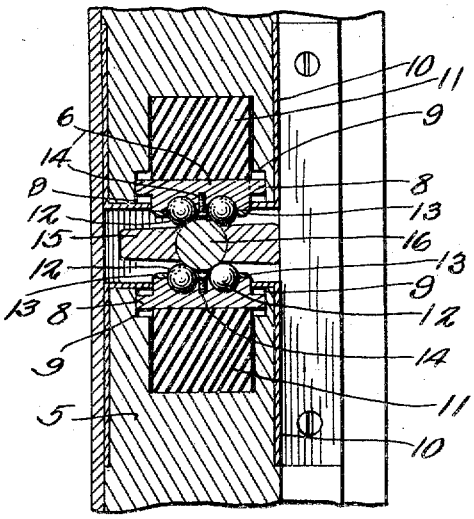
Figure 1 is a vertical sectional view through a door jamb equipped with an anti-rattling device, constructed in accordance with the invention.
Figure 4:
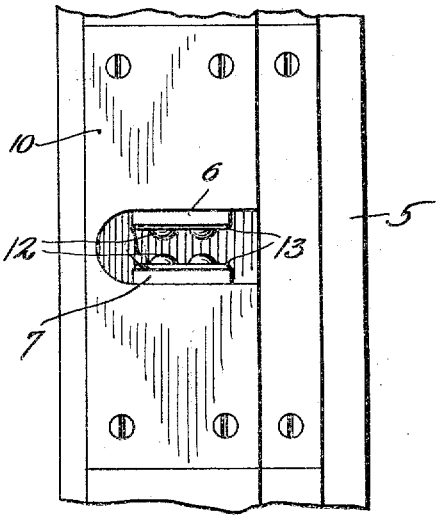
Figure 4 is an elevation of the socket member.
Figure 2:
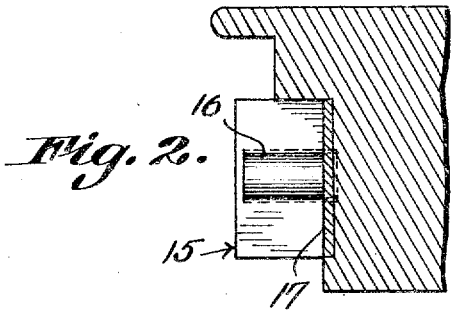
Figure 2 is a plan view of the finger that is carried by the door, and which forms a part of the anti-rattling device.
Figure 5:
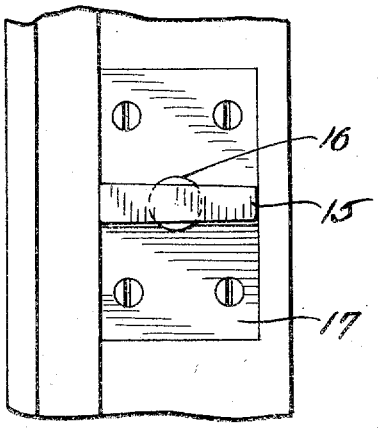
Figure 5 is an elevational view of the tongue or finger, carried by the door.
Figure 3:
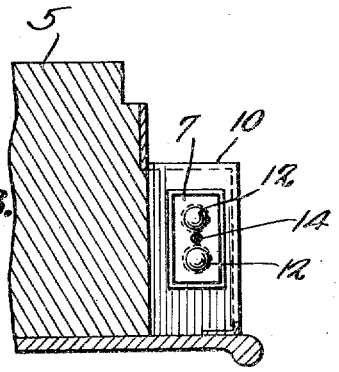
Figure 3 is a plan view of the lower socket section of the anti-rattler.

Referring to the drawing in detail, the reference character 5 designates a door jamb of a motor vehicle, the same being formed with a cut out portion for the reception of the anti-rattling device forming the subject matter of this invention.

The anti-rattling device comprises opposed blocks 6 and 7, each block being provided with lateral flanges 8 that fit within the recesses 9 formed in the openings of the door jamb. Metallic housings 10 are mounted on the door jamb, and as shown portions thereof extend over the flanges 8, to restrict movement of the blocks 6. It might be stated, however, that these recesses 9 are of lengths to permit of slight movement of the blocks 6. The blocks 6 rest against the rubber cushioning blocks 11, that are of lengths to hold the blocks 6 in spaced relation with the inner edges of the recesses in which they move. The blocks 6 are formed with circular depressions to receive the ball 12 that are arranged in pairs, the balls being held in place by means of the plates 13 that are formed with openings to fit over the balls 12, the plates being held in position by means of the screws 14.

Secured to the door of the vehicle, is a tongue 15 which is formed with a central opening to receive the roller 16, the roller being held in position by means of the plate 17. This roller is of a diameter to closely fit within the spaces between the balls 12 of each pair, the construction of the balls and roller being such that the roller will force the blocks 6 inwardly against the tension of the rubber cushioning blocks 11, providing a close fit between the tongue and blocks.

From the foregoing it will be obvious that when the door is moved to its closed position, the roller 16 will be firmly gripped between the balls supported by the blocks 6, and that vertical movement of the tongue 15 between the blocks, will be restricted by the cushioning blocks 11.

I claim:

1. An anti-rattling device for motor vehicle doors, comprising a housing fitted on the door jamb, said door jamb having recesses, movable blocks supported within the recesses, pairs of balls positioned in the blocks, means for cushioning the movements of the blocks, a tongue carried by the door, a roller supported within the tongue and extending beyond the upper and lower surfaces of the tongue, and said roller adapted to engage between the balls to cushion the movements of the door.

2. An anti-rattling device for motor vehicle doors, comprising a pair of movable blocks, antifriction balls carried by the blocks and arranged in spaced relation with each other, yieldable members supported within recesses in the door jamb, and against which the blocks engage, a tongue carried by the motor vehicle door, said tongue adapted to pass between the balls of the blocks, and means on the tongue for engaging between the balls to restrict movement of the door.

3. An anti-rattling device for motor vehicle doors, comprising a housing fitted on the door jamb, said door jamb having recesses, upper and lower movable blocks positioned within the recesses, means for restricting outward movement of the blocks, yieldable members supported within the recesses and engaging the blocks to restrict inward movement of the blocks, pairs of anti-friction balls carried by the blocks, a tongue carried by the motor vehicle door and adapted to move between the anti-friction balls, and a movable member carried by the tongue and engaging the anti-fiction balls, to cushion the movements of the blocks.

4. An anti-rattling device for motor vehicle doors, comprising movable members supported within recesses of the door jamb, cushioning members mounted within the recesses, movable members resting against the cushioning members, anti-friction balls carried by the movable members and extending beyond the outer surfaces thereof, a tongue carried by the door of the vehicle, an anti-friction roller supported within the tongue and adapted to engage between the anti-friction balls to cushion the movement of the door.

5. In a door dovetail, in combination, a casing, an abutment thereon, a carrier vertically slidable in said casing above said abutment, a substantially non-resilient roller carried by said carrier and exposed below the same, and resilient means for urging said carrier downwardly.

In testimony that I claim the foregoing as my own, I have hereto affixed my signature.

ISAAC ANDREWS.